US012714131B2

(12) United States Patent
Annumalla et al.

(10) Patent No.: US 12,714,131 B2
(45) Date of Patent: Aug. 25, 2026

(54) ROASTING SYSTEM

(71) Applicant: Intelligent Bean Co., Seattle, WA (US)

(72) Inventors: Anjaniprasad Nageshrao Annumalla, Seattle, WA (US); Johann Adam, Seattle, WA (US); Diego Balarezo, Quito (EC)

(73) Assignee: Intelligent Bean Co., Seattle, WA (US)

(*) Notice: Subject to any disclaimer, the term of this patent is extended or adjusted under 35 U.S.C. 154(b) by 1057 days.

(21) Appl. No.: 17/857,916

(22) Filed: Jul. 5, 2022

(65) Prior Publication Data

US 2023/0007975 A1 Jan. 12, 2023

Related U.S. Application Data

(60) Provisional application No. 63/218,878, filed on Jul. 6, 2021, provisional application No. 63/218,874, filed on Jul. 6, 2021.

(51) Int. Cl.

| | |
|---|---|
| ***A23N 12/12*** | (2006.01) |
| ***A23F 5/04*** | (2006.01) |
| ***A47J 37/06*** | (2006.01) |

(52) U.S. Cl.
CPC ........ *A23N 12/125* (2013.01); *A47J 37/0641* (2013.01); *A23F 5/04* (2013.01)

(58) Field of Classification Search
CPC ....... A23N 12/125; A47J 37/0641; A23F 5/04
(Continued)

(56) References Cited

U.S. PATENT DOCUMENTS 4,196,342 A 4/1980 Chailloux
4,494,314 A * 1/1985 Gell .......................... F26B 3/08 99/323

(Continued)

FOREIGN PATENT DOCUMENTS

CN 110497551 A 11/2019
WO 03011050 A1 2/2003

(Continued)

OTHER PUBLICATIONS

Aillio, "Bullet Roaster R1 V2 (Includes IBTS + Chaff Filter + ToolKit)," Sep. 2020, URL=https://aillio.com/?product=bullet-roaster-r1, download date Aug. 22, 2022, 2 pages.

(Continued)

*Primary Examiner* — Ibrahime A Abraham
*Assistant Examiner* — Solan Oliva
(74) *Attorney, Agent, or Firm* — Seed Intellectual Property Law Group LLP

(57) ABSTRACT

A roasting system is provided in a form factor of a countertop roasting device including a blower and a roasting assembly in fluid communication with the blower. The roasting assembly receives air from the blower with a heating element of the roasting assembly producing a heated air stream fed through the roasting assembly. A food product is received in a container of the roasting assembly, with the heated air stream roasting the food product. The system includes a microphone and a controller that adjusts operating characteristics of the system based on whether a shell of the food product has cracked during roasting, as determined with the microphone. A waste product from the food product is separated during roasting and collected in a waste collection assembly with a spray bar assisting with smoke suppression.

19 Claims, 7 Drawing Sheets

(58) Field of Classification Search
USPC ........................................................ 99/483
See application file for complete search history.

(56) References Cited

U.S. PATENT DOCUMENTS

| | | | |
|---|---|---|---|
| 4,687,909 A | 8/1987 | Eichler et al. | |
| 4,698,916 A | 10/1987 | Farber | |
| 5,016,362 A * | 5/1991 | Nakamura | 99/286 |
| 5,359,788 A | 11/1994 | Gell, Jr. | |
| 5,564,331 A | 10/1996 | Song | |
| 5,749,288 A | 5/1998 | Skaling | |
| 6,173,506 B1 | 1/2001 | Kruepke et al. | |
| 6,260,479 B1 | 7/2001 | Friedrich et al. | |
| 6,382,087 B1 | 5/2002 | Iiyama | |
| 9,545,169 B2 | 1/2017 | Stordy et al. | |
| 9,706,873 B2 | 7/2017 | Anthony et al. | |
| D802,611 S | 11/2017 | Mangold et al. | |
| D808,994 S | 1/2018 | Mangold et al. | |
| 10,028,615 B2 | 7/2018 | Anthony et al. | |
| 10,463,192 B2 | 11/2019 | Anthony et al. | |
| D883,733 S | 5/2020 | Simonsen | |
| 10,959,575 B2 | 3/2021 | McCullough et al. | |
| 11,051,649 B2 | 7/2021 | Anthony et al. | |
| 11,259,668 B2 | 3/2022 | Yildizli | |
| 11,284,631 B2 | 3/2022 | Laux et al. | |
| 11,324,237 B2 | 5/2022 | Shi et al. | |
| 11,344,053 B2 | 5/2022 | Tun et al. | |
| 11,375,730 B2 | 7/2022 | Scolari | |
| 2003/0061942 A1 | 4/2003 | Erickson et al. | |
| 2005/0167371 A1 * | 8/2005 | Perry | B01S 37/02 210/777 |
| 2016/0295906 A1 | 10/2016 | Jacobsen et al. | |
| 2018/0295870 A1 | 10/2018 | Lopez et al. | |
| 2019/0142053 A1 | 5/2019 | Tun et al. | |
| 2019/0320702 A1 | 10/2019 | Sandhu et al. | |
| 2019/0320703 A1 | 10/2019 | Sandhu et al. | |
| 2019/0350247 A1 | 11/2019 | Lopez et al. | |
| 2020/0288765 A1 | 9/2020 | Lopez et al. | |
| 2021/0227871 A1 | 7/2021 | Sandhu et al. | |
| 2021/0386108 A1 | 12/2021 | Lopez et al. | |

FOREIGN PATENT DOCUMENTS

| | | |
|---|---|---|
| WO | 2020113207 A1 | 6/2020 |
| WO | 2021007086 A1 | 1/2021 |
| WO | WO 2022053522 A1 | 3/2022 |

OTHER PUBLICATIONS

Bellwether Coffee, "Incredible Coffee. Real Impact. Made Simple. The Bellwether Roasting System," Jan. 2016, URL=https://bellwethercoffee.com/, download date Aug. 22, 2022, 3 pages.

Coffee Bean Corral, "Behmor 2000AB Plus," Aug. 10, 2020, URL=https://www.coffeebeancorral.com/product/Behmor-2000AB-Plus-Coffee-Roaster BEHMOR2000AB.aspx, download date Aug. 22, 2022, 4 pages.

Coffee Bean Corral, "Gene Café Drum Roaster Black," Jun. 2014, URL=https://www.coffeebeancorral.com/GENECAFE-Home-Coffee-Roaster.aspx, download date Aug. 22, 2022, 6 pages.

Hottop Americas, "Hottop Americas," Oct. 2021, URL=https://www.hottopamericas.com/, download date Aug. 22, 2022, 1 page.

Hottop Americas, "Hottop Coffee Roaster Available Models," Oct. 2021 URL=https://www.hottopamericas.com/product.html, download date Aug. 22, 2022, 1 page.

Ikawa Home, "Ikawa Home Roasting System," Nov. 2021, URL=https://ikawahome.com/products/ikawa-home-roasting-system, download date Aug. 22, 2022, 5 pages.

Jiyonson BeanGo Cube, "The Smartest Coffee Roaster," Sep. 2020, URL=https://jiyonson.com/about-beango-cube/?lang=en, download date Aug. 22, 2022, 3 pages.

Sweet Maria's Home Coffee Roasting, "Fresh Roast SR800," Nov. 2020, URL=https://www.sweetmarias.com/fresh-roast-sr800.html, download date Aug. 22, 2022, 2 pages.

* cited by examiner

ROASTING SYSTEM

CROSS-REFERENCE TO RELATED APPLICATIONS

This application claims priority to U.S. Provisional Patent Application No. 63/218,874 filed Jul. 6, 2021, and U.S. Provisional Patent Application No. 63/218,878 filed Jul. 6, 2021, the contents of both of which are hereby incorporated by reference in their entirety.

BACKGROUND

Technical Field

The present disclosure is directed to a roasting system and is particularly, but not exclusively, directed to a countertop roasting device for consumer scale roasting applications.

Description of the Related Art

The production of coffee generally begins with the harvesting of coffee cherry fruit. The seeds of the coffee cherry fruit are then dried before being shipped as green coffee beans. The drying process may be performed according to a number of different known methods. The green coffee beans are roasted to yield roasted beans suitable for making coffee.

At a high level, the coffee roasting process includes applying heat to a green coffee cherry seed for a specified period of time to cook the seeds. Coffee beans are initially covered by a dry skin known in the industry as chaff that is removed during the roasting process, along with cooking the seeds, to produce roasted coffee beans suitable for making coffee. While methods of roasting coffee vary, the process can generally be summarized in three steps. The first step is a drying stage to reduce a moisture content of the beans and prepare them for roasting. In some examples, the drying process may be part of the overall roasting process. In other cases, the drying can be done as a separate process ahead of roasting. The second stage is a browning stage, which begins to change the color of the beans from green to yellow while also continuing the drying process. Further, Maillard reactions begin to occur during the browning stage, whereby sugars and amino acids react to create different aroma and color compounds known as melanoids. The coffee begins to emit an audible pop near the end of the browning stage, which is also known as the first crack. After the first crack, the process moves to the third and final stage known as the roast development stage. In this stage, the reaction becomes exothermic and the coffee again cracks (the “second crack”) while also developing additional aroma compounds. Further, the coffee beans emit oils during this stage that can further impact the flavor of the coffee.

The first crack is a phenomenon where coffee beans absorb heat to a certain threshold point and then release the absorbed heat, resulting in a cracking sound. Although the “first crack” suggests a singular occurrence, the first crack can include multiple stages, including a beginning of the first crack when the first crack starts, which is typically followed by a series of cracks, and then a final or end of the first crack. The entire first crack, from the beginning of the first crack to the end, is known as the first crack duration. The second crack may be similar with a duration of the second crack being known as the second crack duration.

The coffee roasting process and the flavor of the resulting coffee is highly dependent on when the roasting process is terminated (i.e., before, during, or after the first or second crack), roasting temperature during the various processing stages, the time of each stage, and the quality and characteristics of the green coffee cherry seeds, among other characteristics. In general, producing coffee with a desirable flavor profile is a complex process. As a result, traditional coffee roasting has been limited to commercial applications utilizing expensive equipment such as commercial drum roasters, bed roasters, and cooling systems.

There are additional inefficiencies and disadvantages with known coffee roasting systems and methods as well. For example, most coffee is roasted in large batches according to relatively standard temperature and time recipes. Such recipes do not take into account variations in bean characteristics, such as initial humidity level, and can therefore lead to a lack of uniformity and sub-optimal flavor development in the final roasted beans. In addition, if the batch size is not suited to the equipment, the resulting roast will not be uniform. Due to the inherent nature of batch roasting, a significant amount of chaff is produced during the earlier part of roasting, followed by significant amount of smoke towards the end of roasting because all of the beans are moving through the various stages together. Batch roasting is also inefficient for changing coffee demands, as batches of the same size are likely to lead to over production or under production of roasted coffee beans as demand changes. Finally, judgment and expertise are needed to know when and how to adjust a heat source, when and how to adjust airflow, and when to stop a roast during a batch roasting operation. Errors with any of the above can impact the entire batch and increase the likelihood of a substantial waste of coffee for incorrect batches. These same issues are not limited to roasting coffee, but are also implicated in other roasting processes as well, such as with respect to nuts and cocoa, among others.

As a result, it would be advantageous to have roasting systems, devices, and methods that overcome the disadvantages of known roasting systems.

BRIEF SUMMARY

The present disclosure is generally directed to roasting systems, devices, and methods that may be applicable to consumer scale and commercial roasting applications. In one example, a countertop roasting device includes a blower, a roasting assembly in communication with the blower, and a waste collection assembly in communication with the roasting assembly. The roasting assembly includes a container for receiving a food product and a heating element. The blower is operable to output air to the heating element, which heats the air to a heated air stream. The heated air stream is provided to the container of the roasting assembly under pressure from the blower. The food product in the container is roasted by the heated air stream, which may also remove a waste product from the food product. In some examples, the roasting assembly also includes additional heat sources, such as a radiation heat source, conduction heat source, or others. The waste product exits the roasting assembly to the waste collection assembly.

The waste collection assembly may include a cyclonic separator for separating the particulate waste product from the air stream and collecting the same in a collection bin. In some examples, the waste collection assembly includes a spray bar and a water tank in fluid communication with the spray bar and the collection bin in a fluid loop. The water tank provides water to the spray bar, which sprays the incoming waste product and air mixture to help separate particulate matter from the air. In addition, the water output by the spray bar suppresses smoke that may be generated during roasting. The waste collection assembly may also include one or more filters for smoke suppression. Smoke suppression can be achieved by the water mist only or the one or more filters only, or with both water misting and one or more filters. The water collects in the bin with the waste product, and is returned to the water tank for reuse. The collection bin can then be emptied to remove the waste.

The device may further include a microphone, a camera, and other sensors for gauging the roasting process and providing signals to a controller to adjust operating characteristics, such as at least the air speed output by the blower and the heat output by the heating element, in a control loop that adjusts the roasting profile based on the detected qualities of the food product. A user may also be able to select different recipes and roasting profiles through a user interface of the device or on a mobile computing device, or both, with the control loop adjusting the recipe based on the detected parameters. In some examples, the food product is green coffee cherry seeds and the waste product is chaff that results from roasting of the coffee with the above device enabling uniform coffee roasting of green coffee cherry seeds with different characteristics in a countertop appliance.

In yet further examples, the device automatically dispenses the roasted beans into a storage container or stores the roasted beans in an airtight space and grinds and dispenses the beans as needed in response to user demand. The device may also be associated with one or more remote computing devices, including but not limited to a mobile device with a mobile application displayed via a graphical user interface on the mobile device for sharing recipes between users as well as creating a digital roast artist platform.

BRIEF DESCRIPTION OF THE SEVERAL VIEWS OF THE DRAWINGS

The present disclosure will be more fully understood by reference to the following figures, which are for illustrative purposes only. These non-limiting and non-exhaustive embodiments are described with reference to the following drawings, wherein like labels refer to like parts throughout the various views unless otherwise specified. The sizes and relative positions of elements in the drawings are not necessarily drawn to scale in some figures. For example, the shapes of various elements are selected, enlarged, and positioned to improve drawing legibility. In other figures, the sizes and relative positions of elements in the drawings are exactly to scale. The particular shapes of the elements as drawn may have been selected for ease of recognition in the drawings. The figures do not describe every aspect of the teachings disclosed herein and do not limit the scope of the claims.

DETAILED DESCRIPTION

Figure 1A:
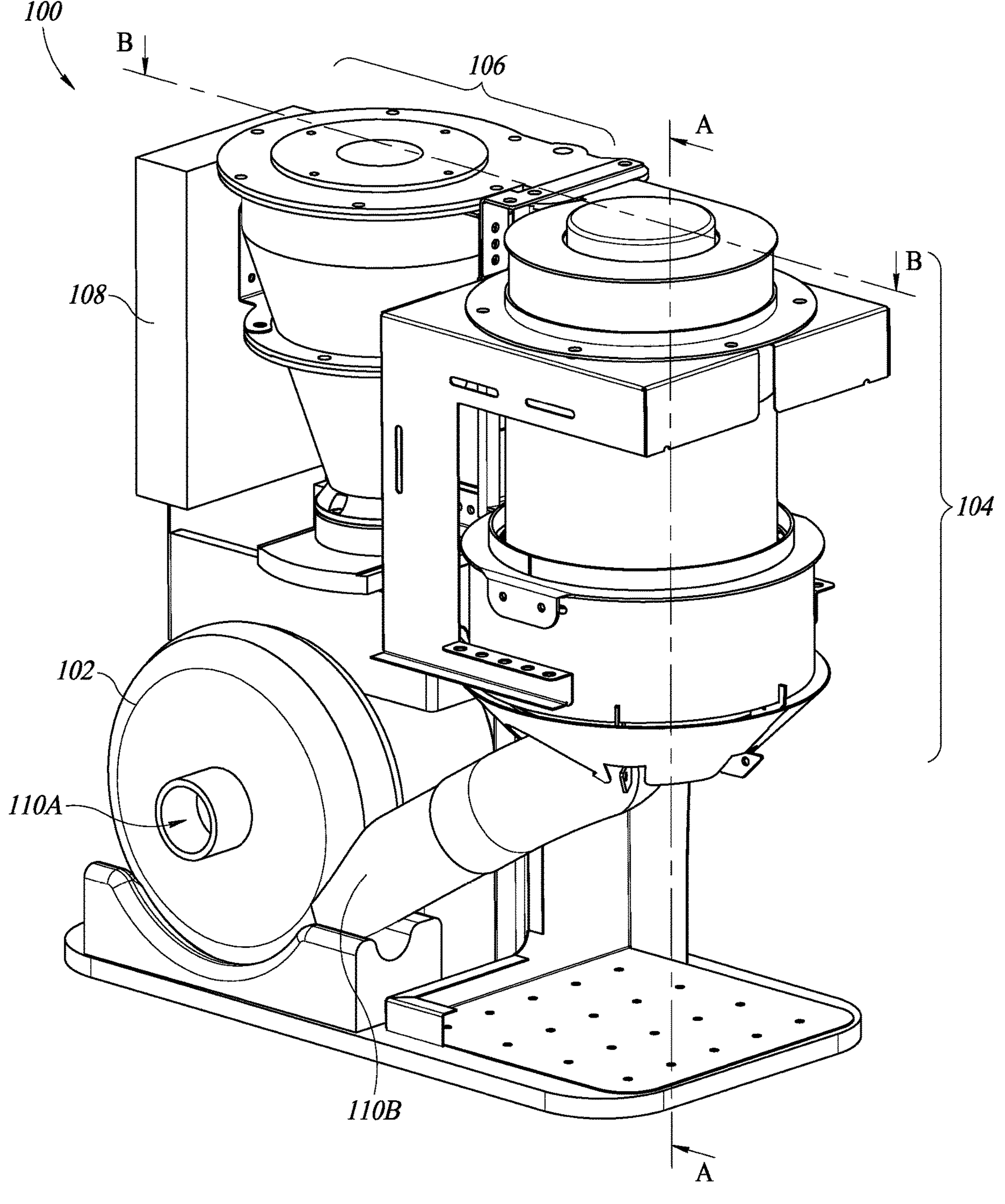
FIG. 1A is a front isometric view of an embodiment of a roasting system according to the present disclosure.

Persons of ordinary skill in the relevant art will understand that the present disclosure is illustrative only and not in any way limiting. Other embodiments of the presently disclosed systems and methods readily suggest themselves to such skilled persons having the assistance of this disclosure.

Each of the features and teachings disclosed herein can be utilized separately or in conjunction with other features and teachings to provide roasting systems, devices, and methods. Representative examples utilizing many of these additional features and teachings, both separately and in combination, are described in further detail with reference to attached FIGS. 1A-5. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced, but are not intended to limit the dimensions and the shapes shown in the examples in some embodiments. In some embodiments, the dimensions and the shapes of the components shown in the figures are exactly to scale and intended to limit the dimensions and the shapes of the components.

Roasting systems, devices, and methods are described herein for roasting a food product and producing a roasted food product implemented in, for example, a form factor of a countertop appliance. In addition, techniques are described for controlling operational characteristics of the roasting systems, devices, and methods based on user input as well as sensors in a feedback control loop. Some or all of the techniques described herein may be performed by automated operations of an embodiment of the roasting devices, systems, and methods, as discussed in greater detail below.

As used herein, the term "user" may refer to any human operator of a device, system, or system described in the present disclosure. The term "selecting," when used herein in relation to one or more elements of a graphical user interface or other electronic display, may include various user actions taken with respect to various input control devices depending on the client computing device used to interact with the display, such as one or more clicks using a mouse or other pointing device, one or more tapping interactions using a touch screen of a client device, etc. In addition, such selecting may additionally comprise interactions with various physical actuators capable of generating electrical or electronic signals as a result of such interactions. A nonexclusive list of examples of such actuators include electronic, mechanical or electromechanical implementations of keys, buttons, pressure plates, paddles, pedals, wheels, triggers, slides, touchpads, or other touch- or motion-sensitive element on the device, and may be digital or analog in nature.

Although the present disclosure will proceed to describe certain embodiments of roasting systems, devices, and methods for roasting coffee cherry seeds, it should be appreciated that the concepts of the disclosure are not limited thereto and can be applied broadly to other roasting applications. For example, the concepts of the disclosure can likewise be applied to other food products and food items, such as least nuts, cocoa, and others. Moreover, the roasting systems, devices, and methods herein can be implemented in a number of different form factors, with the figures merely providing representative examples to illustrate concepts of the disclosure. While a form factor of a countertop appliance is a particularly advantageous embodiment for the concepts of the disclosure, it should be understood that the concepts of the disclosure can be applied equally to commercial roasting applications. In one non-limiting example, the controller described herein and the feedback control loop are particularly well suited to commercial roasting applications, among others.

Figure 1B:
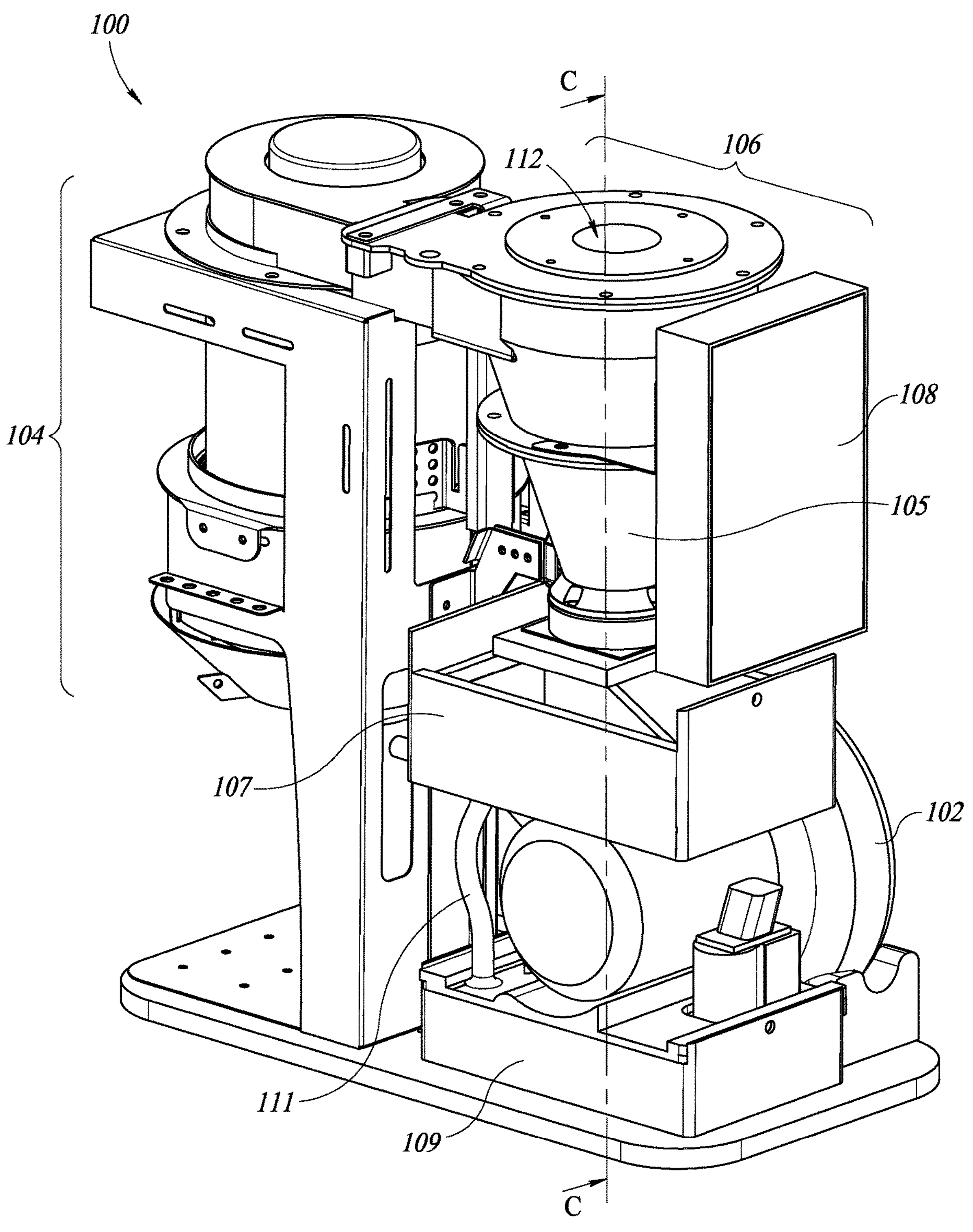
FIG. 1B is a rear isometric view of the roasting system of FIG. 1A.

FIG. 1A and FIG. 1B are front and rear isometric views, respectively, of a roasting system 100. Beginning with FIG. 1A, the roasting system 100 is illustrated in the form factor of a countertop appliance, among other available form factors. In the present disclosure, the roasting system 100 is illustrated without an outer housing or cover for clarity and to provide more detail regarding the internal components of the system 100, although the disclosure contemplates an outer housing or protective cover. The implementation of the system 100 as a countertop appliance enables consumers and other users to enjoy the benefits of freshly roasted coffee at home, while also allowing users to experiment with different coffee recipes and enabling a direct to consumer model for coffee roasting that benefits coffee growers as well as end consumers. The concepts of the disclosure also enable on-demand coffee roasting according to user demand, as the same may change over time, while producing a high level of uniformity in the roast regardless of batch size, which both reduce waste.

The roasting system 100 generally includes a blower 102 (which may also be referred to herein as a fan 102), a roasting assembly 104 coupled to the blower 102, a waste assembly 106 coupled to the roasting assembly 104, and a controller 108. Generally, and as described further below, the blower 102 is operable to output air to the roasting assembly 104, which contains a heating element for generating a heated air stream that roasts a food product or item in the roasting assembly 104. Waste products or particulates from the roasting process are sent to the waste assembly 106, where they are separated from the air and collected before air is vented. The waste assembly 106 may also include smoke suppression capability, namely the capability to reduce smoke created from food processing.

The blower 102 includes an intake 110A and an outlet 110B as well as a motor and an impeller internal to the blower 102. In an embodiment, the motor is an electric motor, such as a direct current (DC) or alternating current (AC) brushless, brushed, direct drive, linear, servo, or stepper motor. The motor receives power from an external source, which may in some cases be controlled by the controller 108, as described herein. When the motor receives power, the motor rotates the impeller and creates negative pressure at the intake 110A to draw air into the blower 102. Then, the rotation of the blower generates centrifugal force that propels an air stream out of the outlet 110B at a speed that depends on the power provided to the motor (i.e., the revolutions per minute of the motor), the size of the motor, the characteristics of the impeller, and the dimensions of the intake 110A and outlet 110B, among other factors.

Turning to FIG. 1B, with continuing reference to FIG. 1A, the blower 102, the roasting assembly 104, and the waste assembly 106 define an air flow path through the system 100 from the intake 110A of the blower 102 to a vent 112 of the waste assembly 106. More specifically, the air stream is provided by the blower 102 from an external environment to the roasting assembly 104, through the assembly 104, and into the waste assembly 106 before returning to the external environment via vent 112 of the waste assembly 106. As a result, the intake 110A of the blower 102 is in communication with an external environment, the outlet 110B of the blower 102 is in communication with the roasting assembly 104, the roasting assembly 104 is in communication with the waste assembly 106, and the vent 112 is in communication with the external environment to complete the open fluid path through the system 100. Further, the controller 108 is in communication with the blower 102, the roasting assembly 104 (including the various components of the roasting assembly 104, such as the heating element and sensors described below), and the waste collection assembly 106, either wired or wirelessly, as well as other aspects of the system 100, and controls or adjusts certain operating characteristics of the system 100, as described in more detail with reference to FIG. 5.

FIG. 1B also illustrates that the waste assembly 106 includes a separation chamber 105 in communication with the roasting assembly 104, a collection bin 107 (which may also be referred to herein as a receptacle 107), a water tank 109, and a hose 111 between the water tank 109 and the collection bin 107. These and other aspects of the waste assembly 106 will be described in more detail with reference to FIG. 4.

Figure 2A:
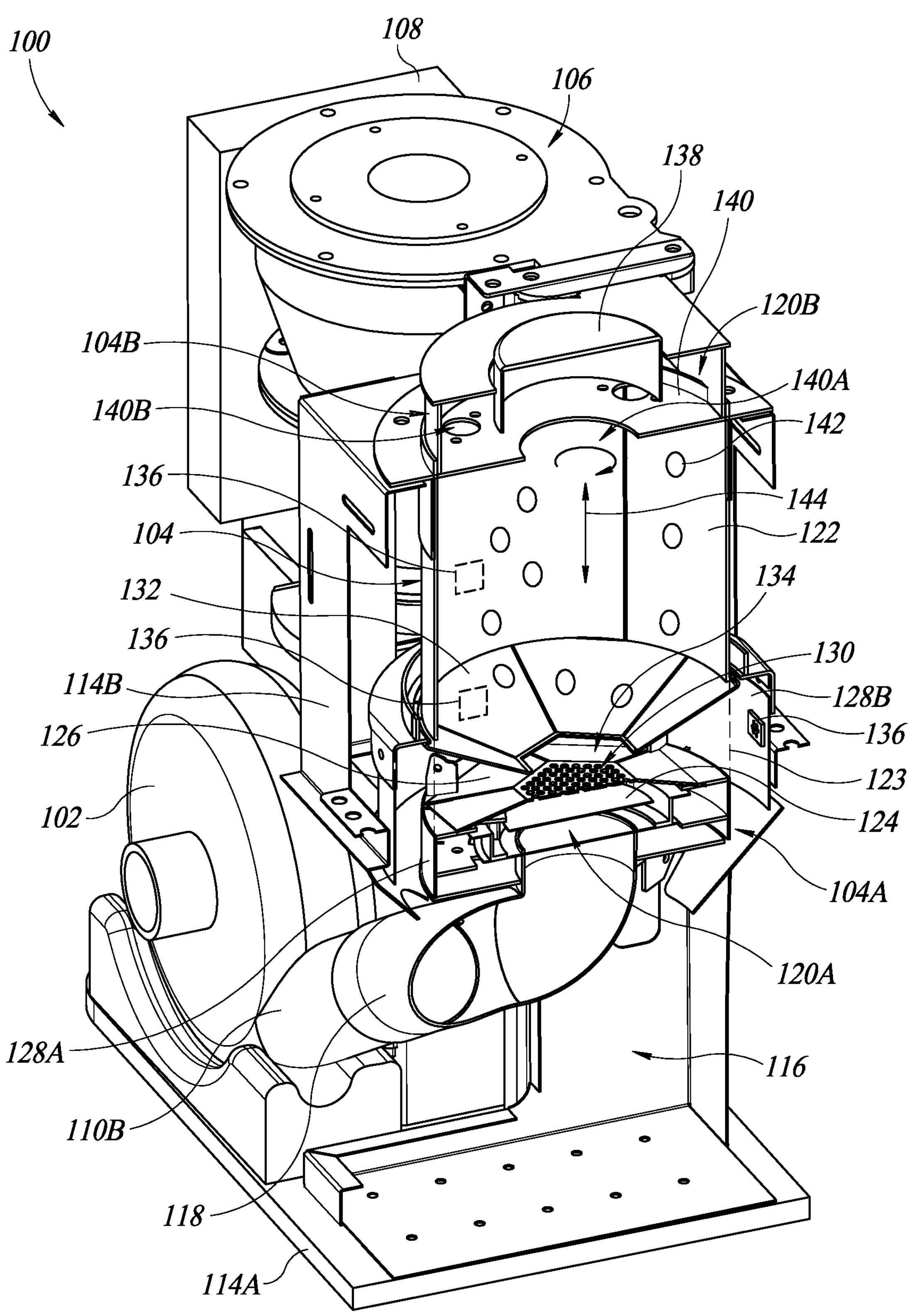
FIG. 2A is an isometric cross-sectional view of a first position of a roasting assembly of the roasting system of FIG. 1A along line A-A in FIG. 1A.
Figure 2B:
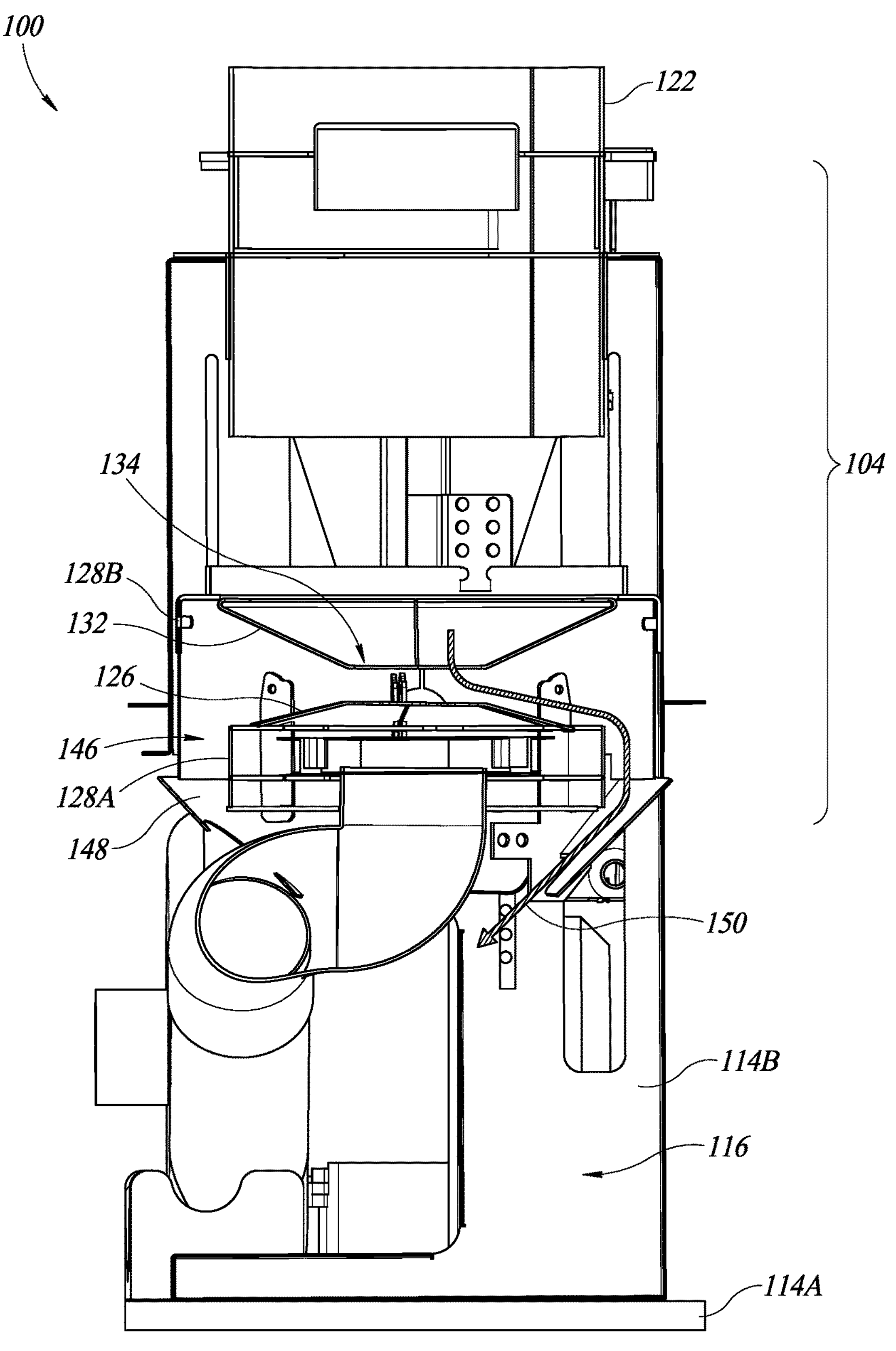
FIG. 2B is an elevational cross-sectional view of a second position of the roasting assembly of the roasting system of FIG. 1A.

FIG. 2A and FIG. 2B are isometric views of the system 100 with a cut along line A-A in FIG. 1A to provide a cross-sectional view of the roasting assembly 104. The system 100 includes a support structure with a base 114A and a frame 114B coupled to the base 114A. Except as otherwise provided herein, each of the blower 102, the roasting assembly 104, the waste assembly 106, and the controller 108 may be coupled to or otherwise mounted on one or both of the base 114A and the frame 114B with fasteners, such as screws, bolts, nuts, and the like, or other adhesive and coupling devices and methods. It is to be appreciated that the support structure is non-limiting in nature and the base 114A and frame 114B may be modified, omitted, or substituted with other support devices in additional embodiments. In particular, the roasting assembly 104 and the waste assembly 106 are coupled to the frame 114B and at least partially spaced from the base 114A. For example, the roasting assembly 104 is suspended above the base 114A by a gap or space 116 having a size and a shape to receiver a container or some other vessel for receiving a roasted food product from the roasting assembly 104. The position of the roasting assembly 104 can be selected to vary the size of the space 116 between a bottom of the roasting assembly 104 and the base 114A.

The system 100 also includes an elbow 118 with a first end coupled to, and in communication with, the outlet 110B of the blower 102. A second end of the elbow 118 is coupled to, and in communication with, an inlet 120A of the roasting assembly 104. As a result, the blower 102 is operable to provide an air stream to the roasting assembly 104 via outlet 110B of the blower 102, the elbow 118, and the inlet 120A of the roasting assembly 104. The inlet 120A of the roasting assembly 104 may be an opening with a size and a shape to receive the elbow 118 with the elbow being a section of curved or bent pipe for connecting the blower 102 to the roasting assembly 104. In some embodiments, the inlet 120A of the roasting assembly 104 is positioned proximate to, or at, a first end 104A of the roasting assembly 104, which may be a bottom end 104A of the roasting assembly 104. The roasting assembly 104 further includes a second or top end 104B opposite to the first end 104A with the second end 104B including an outlet 120B in communication with the waste assembly 106. In an embodiment, the roasting assembly 104 is arranged vertically or substantially vertical, with air flow following a tortuous, but generally vertical, path through the roasting assembly 104 from the inlet 120A at the first end 104A to the outlet 120B at the second end 104B of the roasting assembly 104.

The roasting assembly 104 includes a container 122, which may be an open cylinder made of glass, plastic, metal, or another like material, as well as a heating element 124. The heating element 124 may be a resistor that converts electricity to heat, such as a heating coil, or may be a heat plate, a burner, or some other type of heating element. A grate 126 is positioned on the heating element 124 with the heating element 124 and the grate 126 coupled to one or more support cylinders 128A, 128B (which may also be referred to herein as covers 128A, 128B) that are in turn coupled to the frame 114B. The support cylinders 128A, 128B are pieces of sheet metal arranged as open cylinders that not only support and cover the heating element 124 and the grate 126, but that also have a relatively large surface area and act as heat sinks to dissipate heat output by the heating element 124 during operation. In FIG. 2A, the system 100 includes two support cylinders, namely an inner support cylinder 128A directly coupled to the heating element 124 and the grate 126 as well as an outer support cylinder 128B extending beyond the container 122 and spaced from the inner support cylinder 128A, although the same is not necessarily required and the system 100 can include more or less than two support cylinders. The grate 126 further includes a plurality of openings 130 through the grate 126 that may be arranged in a pattern of column and rows with equidistant spacing, or a selected spacing, between openings 130 in each column and row as well as between the columns and rows. In an embodiment, and as shown in FIG. 2A, the grate 126 includes a raised hexagonal surface with the openings 130 being through an entirety of only the raised hexagonal surface. Other arrangements of the openings 130 are contemplated herein, such as openings 130 in less than the entire raised surface, openings along any portion of, or other surfaces of, the grate 126, and openings 130 in different patterns. The grate 126 also tapers toward the first end 104A of the roasting assembly 104A, and thus has sloped or angled walls that extend away from the raised surface.

Thus, starting from the bottom of the roasting assembly 104, the roasting assembly 104 includes an inlet 120A with the heating element 124 positioned over at least a portion of the inlet 120A and in a path of the air entering the roasting assembly 104 through the inlet 120A. The grate 126 is positioned over the heating element 124. The roasting assembly 104 further includes a deflector plate 132 positioned above the grate 126 and including an aperture 134 aligned with the openings 130 in the grate 126. More specifically, the aperture 134 of the deflector plate 132 may have a size and a shape that matches the raised surface of the grate 126 that includes the openings 130. The aperture 134 may be positioned at a bottom of the deflector plate 132, with sides of the plate 132 tapering toward the second end 104B of the roasting assembly 104 such that the deflector plate 132 is in the shape of an inverted truncated cone with the aperture 134 at the truncated end.

In some embodiments, the roasting assembly 104 further includes at least one sensor 136 coupled to the roasting assembly 104. The sensor 136 may be one or more of a microphone or auditory sensor, an imaging device, a gas sensor, a humidity sensor, a thermocouple, and others. The sensor 136 may be coupled to one of the support cylinders 128, such as anywhere along an interior surface of the outer support cylinder 128B and facing toward the container 122. In some embodiments, the sensor 136 is instead positioned on either an inner or outer surface of the container 122 or an inner or outer surface of the deflector plate 132, among other possible locations. The sensor 136 is operable to detect certain characteristics of the roasting process and provide data, information, or other signals to the controller 108. The roasting assembly 104 also includes a removable cap 138 to selectively provide access to the container 122 as well as a filter plate 140 at the top of the container 122. The filter plate 140 includes a central hole 140A as well as a plurality of smaller outer holes 140B spaced around the central hole 140A. The number and arrangement of the holes 140A, 140B may be selected according to design factors. The central hole 140A is aligned with the cap 138 and provides access to the container 122 following removal of the cap 138. The outer holes 140B may assist with filtering waste material while retaining a food product or food item in the container 122 during operation of the roasting assembly 104. In an embodiment, the central hole 140A does not have a filtration function, but rather, enables green coffee cherry seeds to be poured into the container 122 through the central hole 140A following removal of the cap 138. Further, and as described in more detail herein, filtration of the waste material may occur via outer holes 140B only, at the waste assembly 106 only, or with both the outer holes 140B and the waste assembly 106.

The roasting assembly 104 in FIG. 2A is illustrated in a first or closed position with the container 122 in contact with, and sealed against, the deflector plate 132. In some embodiments, walls of the container 122 extend to the inner support cylinder 128A in the first position as shown by dashed lines 123 in FIG. 2A with the deflector plate 132 positioned internal to the container 122. The first position of the roasting assembly 104 corresponds to an operational configuration of the roasting assembly 104. In operation, a user inserts a selected amount of a food product 142, such as green coffee cherry seeds into the container 122, by removing the cap 138 and inserting the seeds 142 through central opening 140B in the filter plate 140. The container 122 holds the food product 142 in place inside the container 122 in the first position. For example, in an embodiment where walls of the container 122 extend to the inner support cylinder 128A, the food product 142 is sealed inside the container 122 with the inner support cylinder 128A and the grate 126 closing the bottom of the container 122. In some embodiments, the system 100 includes a small container to store the green coffee cherry seeds and automate pouring the seeds into the container 122 or a pull or push mechanical system where green coffee cherry seeds are fed into the container 122 in response to an input by a user or the determined internal conditions of the container 122, such as temperature of air within the container 122.

The user then replaces the cap 138 and activates the system 100. The blower 102 provides the air stream to the inlet 120A of the roasting assembly 104 via the outlet 110B of the blower 102 and the elbow 118. In some embodiments, the elbow 118 is optional and may be omitted. For example, the blower 102 may be arranged in a different position relative to the roasting assembly 104 with the outlet 110B of the blower 102 feeding directly into the container 112 without the elbow 118. The heating element 124 heats the air stream to a heated air stream that is directed to the openings 130 in the grate 126. The openings 130 structure airflow in the container 122 to generate movement of the food product 142 in the container 122. In particular, the openings 130 may be positioned at selected angles and spacing to generate movement of the food product 142 at least vertically, laterally (left to right and front to back in the orientation shown in FIG. 2A) and rotationally, represented by arrows 144 in FIG. 2A. At the same time, the heated air stream roasts the food product 142, as described herein. Further, the deflector plate 132 prevents the food product 142 from falling out of the bottom of the container 122. In particular, the aperture 134 of the deflector plate 132 is aligned with the surface of the grate 126 including the openings 130. As such, the heated air stream is continuously passing through the aperture 134 of the deflector plate 132 from the openings 130. As the food product 142 falls to the bottom of the container 122, food product 142 is directed towards the aperture 134 by the sloped or angled walls of the deflector plate 132, and the heated air stream through the aperture 134 moves the food product 142 back to the top of the container 122. In this way, the food product 142 does not fall out of the container 122 during roasting, but instead may "bounce," "hop," or "jump" in the container 122 during roasting.

The roasting process may also cause the food product 142 to shed certain waste materials, such as chaff, a skin, or a shell in some non-limiting examples. The heated air stream directs the waste materials and excess air to the outlet 120B of the roasting assembly 104 and to the waste assembly 106 with the filter plate 140 assisting with preventing the remaining food product from leaving the top of the container 122. The roasting and waste removal processes continue until the food product 142 is satisfactorily roasted and the waste removed.

Turning to FIG. 2B, with continuing reference to FIG. 2A, the roasting assembly 104 is illustrated in a second position following conclusion of the roasting process described above. The container 122 is structured to slide to release the food product 142 after completion of the roasting process described above. In other words, the container 122 is held in place by the frame 114B (i.e., constrained from moving left to right and front to back in the orientation of FIG. 2B), but is not physically coupled to the roasting assembly 104 such that the container 122 is able to slide vertically.

Once the roasting process is finished, the user may slide the container 122 vertically to unseat the container 122 from the deflector plate 132 or the inner support cylinder 128, as appropriate, corresponding to the second position of the roasting assembly 104. In an embodiment, the movement of the container 122 is automated through one or more drive devices, such as an electric motor or linear actuator. In the second position, the remaining roasted food product 142 (FIG. 2A) can escape the roasting assembly 104 through the aperture 134 in the deflector plate 132, pass through a gap 146 between the inner and outer support cylinders 128A, 128B with the sloped or angled walls of the grate pushing the food product 142 (FIG. 2A) toward the gap 146, and slide along a guide plate 148 with sloped sides and a central opening to the space 116 between the roasting assembly 104 and the base 114A to be received in a container or other vessel provided by the user or sold as a unit or kit with the system 100 and designed to be received in the space 116 such that the user only places a lid on the vessel following the roasting and dispensing processes above. The path of travel of the roasted food product is illustrated conceptually by arrow 150 in FIG. 2B.

Figure 3:
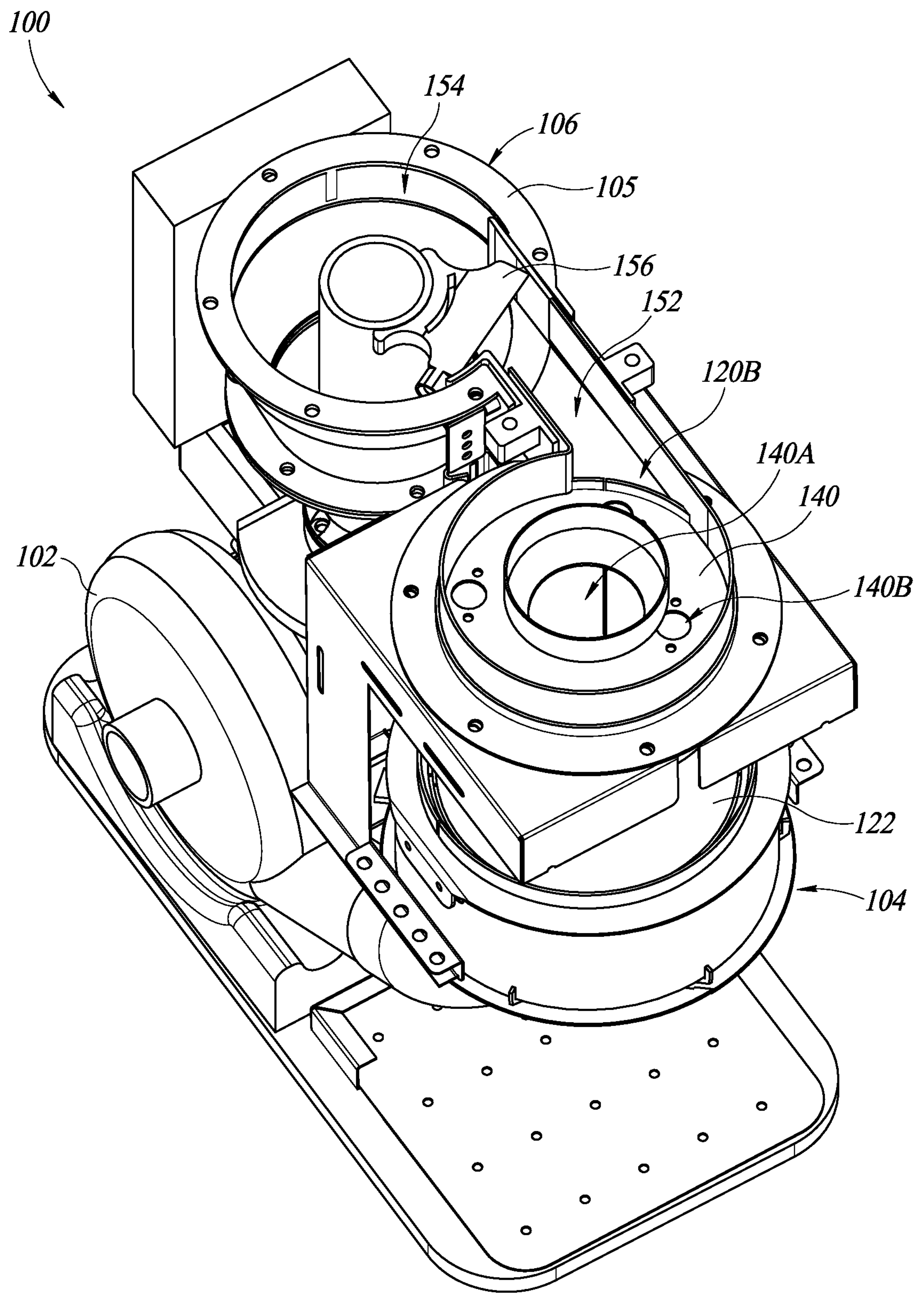
FIG. 3 is an isometric cross-sectional view of an interface between the roasting assembly and a waste collection assembly of the roasting system of FIG. 1A along line B-B in FIG. 1A.

FIG. 3 is a top isometric view of the system 100 with a cut along line B-B in FIG. 1A to provide more detail of an interface between the roasting assembly 104 and the waste collection assembly 106. The separation chamber 105 of the waste collection assembly 106 is in communication with the outlet 120B of the roasting assembly via a channel 152 bounded on all sides by walls or plates of the system 100. In addition, the channel 152 (or the walls defining the channel) extends around the filter plate 140 and the holes 140A, 140B to collect waste matter and prevent the waste from returning to the container 122. Waste material or particulate matter and air pass through the holes 140A, 140B in the filter plate 140 and into the channel 152. In an embodiment, the holes 140A, 140B also assist with smoke suppression and may include filters in one or more of the holes 140A, 140B for that purpose. In the channel 152, the waste material is prevented from returning to the container 122 via air flowing through the holes 140A, 140B to provide a directional path of travel along the channel 152 to the waste assembly 106. As shown in FIG. 3, the small outer holes 140B of the filter plate 140 of the roasting assembly 104 may be spaced equidistant, or in some other selected spacing arrangement about the central larger hole 140A that corresponds in size and shape to the cap 138 in some embodiments. In operation, the cap 138 also prevents waste material from exiting the roasting assembly 104, such that the waste material is directed only to the waste assembly 106. In an embodiment, the holes 140A, 140B are the same or different sizes with the size of the holes 140A, 140B selected according to design factors.

The channel 152 is in communication with an inlet 154 of the separation chamber 105, which may be a top opening of the separation chamber 105. Thus, the air and waste material is forced along the channel 152 under pressure from the blower 102 and into the separation chamber 105 of the waste assembly 106. In some embodiments, the waste assembly 106 may also include a spray bar 156 positioned proximate to, or in, the inlet 154 of the separation chamber 105 that will be described in more detail in the following description of FIG. 4.

Figure 4:
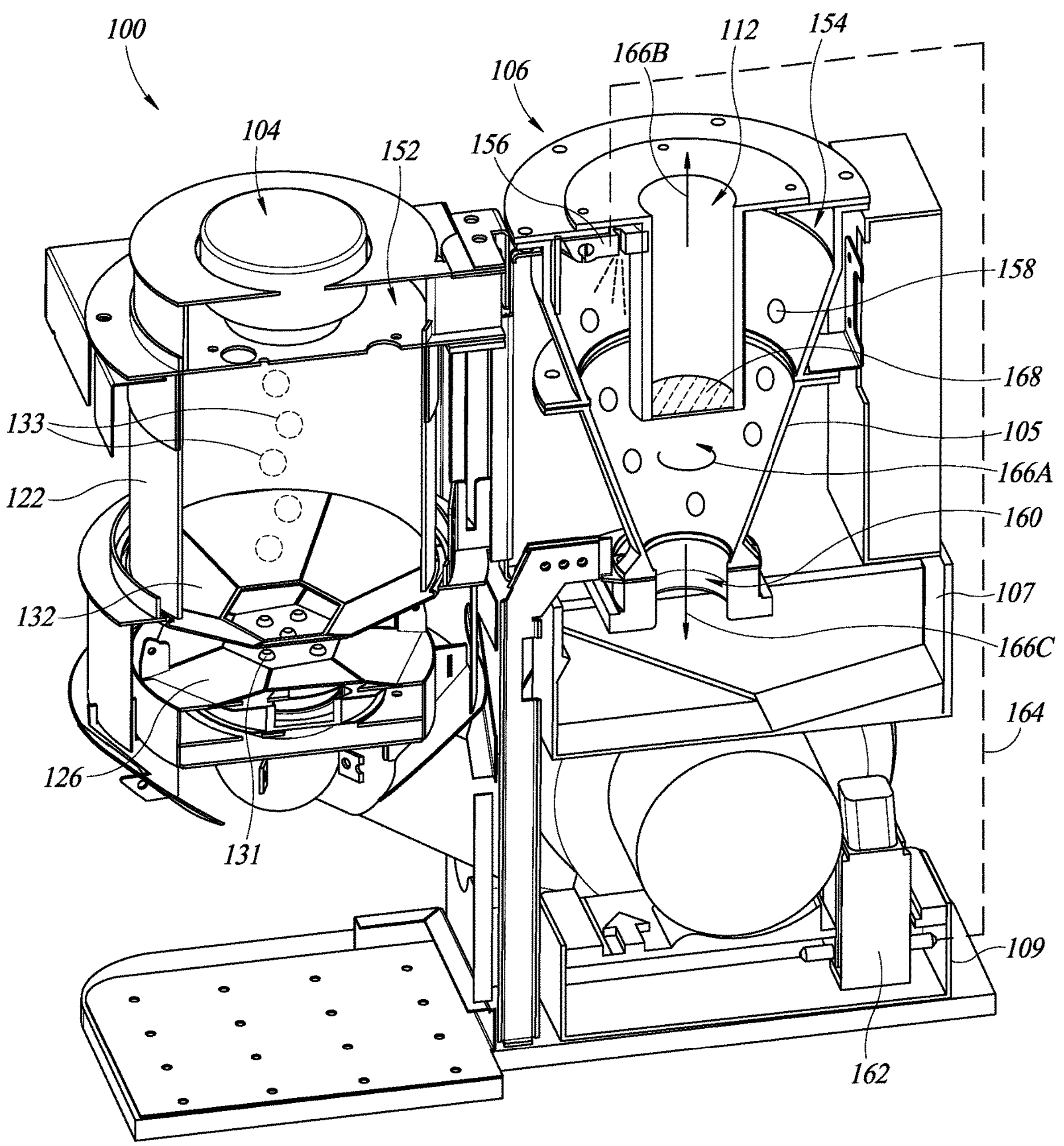
FIG. 4 is an isometric cross-sectional view of the waste collection assembly of the roasting system of FIG. 1B along line C-C in FIG. 1B.

FIG. 4 is an isometric view of the roasting system 100 with a cut along line C-C in FIG. 1B to provide more detail of the roasting assembly 104 and the waste assembly 106 in a cross-sectional view. As shown in FIG. 4, the grate 126 of the roasting assembly 104 may include nozzles 131 instead of openings 130 (FIG. 2A). The nozzles 131 may be arranged in a selected number and spacing, such as in a circle or some other shape, concentric circles, a grid layout of selected numbers of rows or columns, or spaced from each other in some other pattern. In addition, the nozzles 131 may each be structured to emit air in a selected direction. For example, the nozzles 131 may have a tip for emitting air that is at an angle to a horizontal and/or vertical axes through a center of the raised surface of the grate 126 between and excluding 0 degrees to 90 degrees and between and excluding 90 degrees to 180 degrees. Such an arrangement of the nozzles 131 may enable different structured airflow patterns to product different movement of the food product in the container 122. Further, the container 122 or the deflector plate 132, or both, may optionally include instead of, or in addition to the nozzles 131, vent holes 133 to assist with airflow through the roasting assembly 104. The vent holes 133 may be smaller than the food product or if larger than the food product, may be covered with mesh, a grate, or some other like structure to prevent the food product from passing through the holes 133.

Turning to the waste assembly 106, and as summarized above, waste matter 158, which may contain particulates such as chaff, skin, shell pieces, and others, is provided to the inlet 154 of the separation chamber 105 via the channel 152. In some embodiments, the incoming air from the roasting assembly 104 to the waste assembly 106 may also include smoke from the roasting process. The collection bin 107 is arranged beneath an outlet 160 of the separation chamber 105. The water tank 109 is in communication with the collection bin 107 via the hose 111 (FIG. 1B). The system 100 also includes a pump 162 arranged at least partially in the water tank 109 and in communication with the spray bar 156 via line 164. Thus, the spray bar 156, the collection bin 107, the water tank 109, and the pump 162 are in communication in a closed fluid loop for recycling water in the waste collection assembly 106 of the system 100.

In operation, the waste matter 158 that includes particulates is mixed with air and provided to the separation chamber 105. The separation chamber 105 may be implemented in the shape of a cone that continuously tapers in diameter over its height with a maximum diameter at the inlet 154 and a minimum diameter at the outlet 160. Further, the vent 112 may be provided in a form factor of a tube coupled to the inlet 154 of the separation chamber 105 and extending vertically through a center of the separation chamber 105. As a result, the separation chamber 105 and tube of the vent 112 may be a cyclonic separator where air is rotated in the separation chamber 105, as indicated by arrow 166A, in a helical pattern around the chamber 105 from the inlet 154 to the outlet 160 before exiting through the center of the chamber 105 and out of the top of the chamber 105 via vent 112, as indicated by arrow 166B. The waste matter 158 or particulates are denser than air and have too much inertia to follow the curve of the air stream. As a result, the waste mater 158 strikes the walls of the separation chamber 105 and fall through the outlet 160 to the collection bin 107, as indicated by arrow 166C. Thus, the waste matter 158 is collected in the bin 107 for later removal and disposal while air is vented through vent 112.

In an embodiment, the pump 162 provides water from the water tank 109 to the spray bar 156 along line 164, and the spray bar 156 generates mist or a water spray. The water from the spray bar 156 may have multiple functions in the waste assembly 106. Specifically, the water may saturate the waste matter 158 and increase its weight and density, thus improving the separation process described above. Further, the water from the spray bar 156 helps separate smoke in the air provided to the separation chamber 105 and prevent smoke from being vented out of the vent 112. The vent 112 may also include a filter, represented schematically by dashed lines 168, to prevent particulates from escaping the chamber 105 and also for reducing smoke output. For example, the filter 168 may be a removable and replaceable carbon filter. The filter 168 may also be a specially designed and custom filter 168 for the system 100 that not only assists with smoke suppression, but also has a size and shape to be received in the vent 112. In an embodiment, the filter 168 may cover only one or both openings of the vent 112 or may fill at least a part of, a majority of, or all of a hollow interior of the tube that forms the vent 112. The water is then collected in the bin 107 and returned to the water tank 109, as above. The collection bin 107, water tank 109, and pump 162 may also include filters to prevent particulate matter from entering the fluid loop. Thus, the system 100 includes functionality for suppressing waste and smoke from roasting to enable countertop roasting applications that are suitable for personal consumer use.

Figure 5:
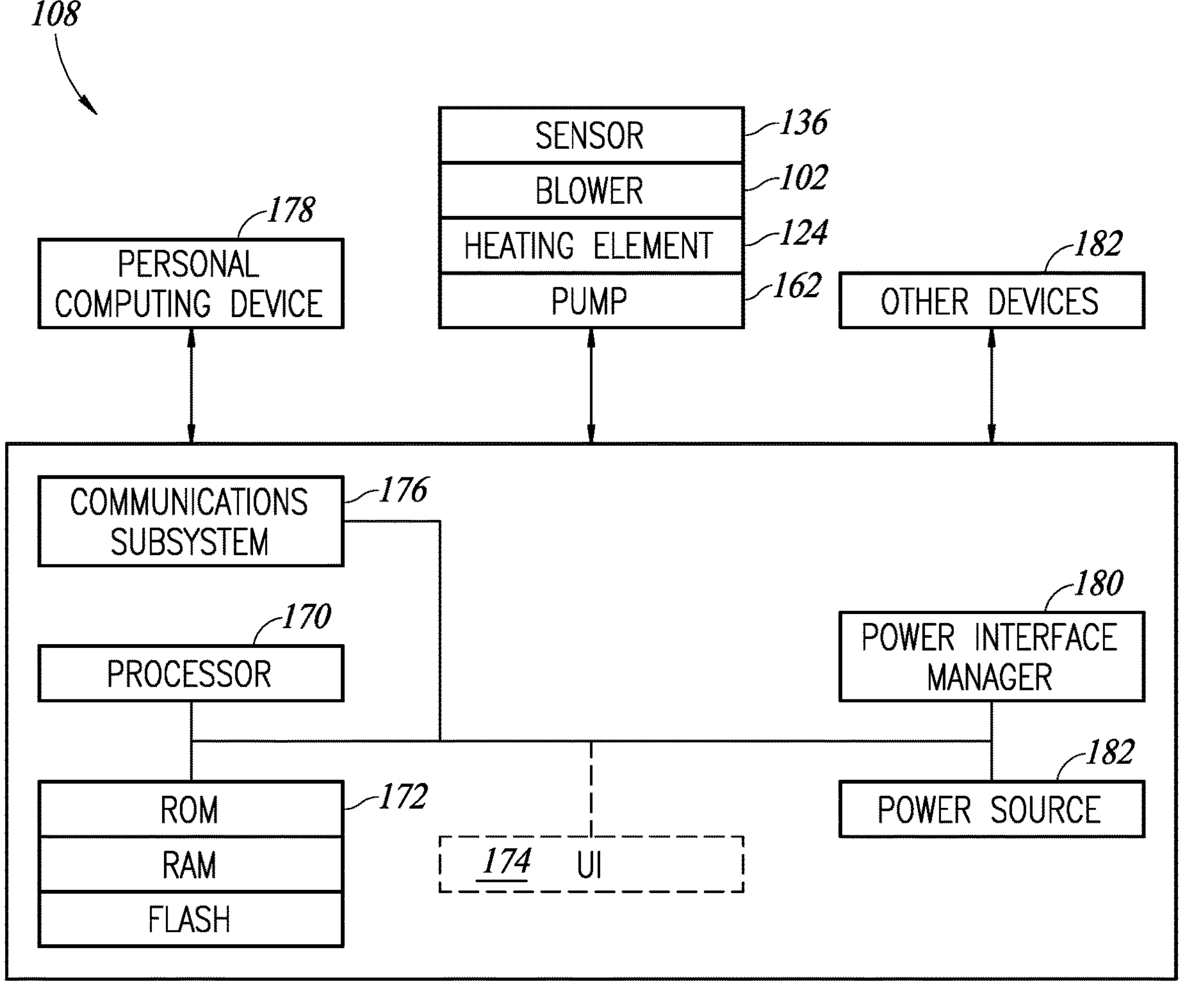
FIG. 5 is a block diagram of an embodiment of a controller suitable for executing an embodiment of a roasting system that performs at least some techniques described in the present disclosure, as well as various devices connected thereto.

FIG. 5 is an embodiment of an electronic system or controller 108 of the system 100 represented in block diagram or schematic form. As further described below, the controller 108 is suitable for executing or otherwise performing at least some embodiments or techniques described herein with respect to the system 100. The physical or hardware aspects of the controller 108 may be located internal to a housing or other device of the system 100, such as represented by controller 108 in FIG. 1A and FIG. 1B.

The controller 108 includes a processor 170, for example a microprocessor, digital signal processor, programmable gate array (PGA) or application specific integrated circuit (ASIC). The controller 108 includes one or more non-transitory storage mediums, for example read only memory (ROM), random access memory (RAM), and/or Flash memory or other physical computer- or processor-readable storage media collectively designated as 172 in communication with the processor 170. The non-transitory storage mediums 172 may store instructions and/or data used by the processor 170 and the controller 108 generally, for example an operating system (OS) and/or applications. The instructions as executed by the processor 170 may execute logic to perform the functionality of the various implementations or techniques of the devices and systems described herein, including, but not limited to, receiving signals, instructions, or other data from aspects of the system 100 and controlling operating parameters of the system 100 in response, or executing instructions for certain roasting recipes selected by a user through a computing device, among others.

The controller 108 may include a user interface 174 ("UP") to enable a user to operate or otherwise provide input to the controller 108 or system 100 described herein regarding the operational state or condition of the controller 108 and/or the system 100. Additionally, the user interface 174 may include a number of user actuatable controls accessible on an exterior of the system 100. For example, the user interface 174 may include a number of switches or keys operable to turn the system 100 ON and OFF and/or to set various operating parameters of the system 100, such as recipe, roast time, air speed, roast temperature, and many others.

In some embodiments, the user interface 174 may include a display, for instance a touch panel display. The touch panel display (e.g., LCD or LED with touch sensitive overlay) may provide both an input and an output interface for the user. The touch panel display may present a graphical user interface, with various user selectable icons, menus, check boxes, dialog boxes, and other components and elements selectable by the end user to set operational states or conditions of the system 100. The user interface 174 may also include one or more auditory transducers, for example one or more speakers and/or microphones. Such may allow audible alert notifications or signals to be provided to the user as a result of manual interaction with the user interface 174. Such may additionally, or alternatively, allow a user to provide audible commands or instructions. The user interface 174 may include additional components and/or different components than those illustrated or described, and/or may omit some components.

The switches and keys of the graphical user interface 174 may, for example, include toggle switches, a keypad or keyboard, rocker switches or other physical actuators of the type described herein. The switches and keys or the graphical user interface 174 may, for example, allow a user to turn ON the system 100, among the additional functionality described herein.

The controller 108 includes a communications sub-system 176 that may include one or more communications modules or components which facilitate communications with various components of one or more external devices, such as a personal computing device or mobile device 178 in an embodiment. The communications sub-system 176 may provide wireless or wired communications to the one or more external devices and may include wireless receivers, wireless transmitters and/or wireless transceivers to provide wireless signal paths to the various remote control device components or systems of the one or more paired devices. The communications sub-system 176 may, for example, include components enabling short range (e.g., via Bluetooth®, BLE ("Bluetooth® low energy"), near field communication (NFC), or radio frequency identification (RFID) components and protocols) or longer range wireless communications (e.g., over a wireless LAN, Low-Power-Wide-Area Network (LPWAN), satellite, or cellular network) and may include one or more modems or one or more Ethernet or other types of communications cards or components for doing so. The communications sub-system 176 may include one or more bridges or routers suitable to handle network traffic including switched packet type communications protocols (TCP/IP), Ethernet or other networking protocols.

The controller 108 further includes a power interface manager 180 that manages supply of power from a power source 182 to the various components of the controller 108 and the system 100. The power interface manager 180 is communicatively coupled to the processor 170 and the power source 182. Alternatively, in some embodiments, the power interface manager 180 can be integrated in the processor 170. The power source 182 may include an external power supply, or a rechargeable or replaceable battery power supply. The power interface manager 180 may include power converters, rectifiers, buses, gates, circuitry, etc. in some embodiments. In particular, the power interface manager 180 can control, limit, and/or restrict the supply of power from the power source 182 to at least the blower 102, the heating element 124, and the pump 162.

In some embodiments, the instructions and/or data stored on the non-transitory storage mediums 172 that may be used by the processor 170 and the controller 108 generally, such as, for example, memory 172, includes or provides an application program interface ("API") that provides programmatic access to one or more functions of the controller 108. For example, such an API may provide a programmatic interface to control one or more operational characteristics of the system 100, including, but not limited to, one or more functions of the user interface 174, processing and/or storing and/or transmitting the data received from the sensors 136, and controlling characteristics of the blower 102, the heating element 124, and the pump 162, among others. Such control may be invoked by one of the other programs, other remote device or system, or some other module. In this manner, the API may facilitate the development of third-party software, such as various different user interfaces and control systems for other devices, plug-ins, and adapters, and the like to facilitate interactivity and customization of the operation and devices within the system 100.

In an embodiment, components or modules of the controller 108 and other devices within the system 100 are implemented using standard programming techniques. For example, the logic to perform the functionality of the various embodiments or techniques described herein may be implemented as a "native" executable running on the controller 108, e.g., processor 170, along with one or more static or dynamic libraries. In other embodiments, various functions of the controller 108 may be implemented as instructions processed by a virtual machine that executes as one or more programs whose instructions are stored in memory 172. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors 170 of the controller 108 to perform the functions of the controller 108. The instructions cause the microprocessor 170 or some other processor, such as an I/O controller/processor, to process and act on information received from the sensors 136, personal computing device 178, or other external device to provide the functionality described herein.

The embodiments described above may also use well-known or other synchronous or asynchronous client-server computing techniques. However, the various components may be implemented using more monolithic programming techniques as well, for example, as an executable running on a single microprocessor, or alternatively decomposed using a variety of structuring techniques known in the art, including but not limited to, multiprogramming, multithreading, client-server, or peer-to-peer (e.g., Bluetooth®, NFC or RFID wireless technology, mesh networks, etc.), providing a communication channel between aspects of the system 100 and/or controller 108 as well as to external devices 184 or personal computing systems 178, running on one or more computer systems each having one or more central processing units (CPUs) or other processors. Some embodiments may execute concurrently and asynchronously, and communicate using message passing techniques. Also, other functions could be implemented and/or performed by each component/module, and in different orders, and by different components/modules, yet still achieve the functions of the controller 108.

In addition, programming interfaces to the data stored on and functionality provided by the controller 108, can be available by standard mechanisms such as through C, C++, C#, and Java APIs; libraries for accessing files, databases, or other data repositories; scripting languages; or Web servers, FTP servers, or other types of servers providing access to stored data. The data stored and utilized by the controller 108 and overall system 100 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are also possible in other embodiments. Other functionality could also be provided by each component/module, or existing functionality could be distributed amongst the components/modules within the system 100 and/or controller 108 in different ways, yet still achieve the functions of the controller 108 and the system 100.

Furthermore, in some embodiments or implementations, some or all of the components of the controller 108 and components or other devices within the system 100 may be implemented or provided in other manners, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

It will be appreciated that the computing systems and devices described herein, including with respect to controller 108 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, biometric monitoring devices, PDAs, wireless phones, Internet appliances, and various other consumer products that include appropriate communication capabilities. In addition, the functionality provided by the system 100 may in some embodiments be distributed in various modules. Similarly, in some embodiments, some of the functionality of the system 100 may not be provided and/or other additional functionality may be available. In addition, in certain implementations various functionality of the system 100 may be provided by third-party partners of a user of the system 100. For example, data collected by the system 100 may be provided to a third party for analysis and/or metric generation, or recipes may be provided from a third party to a database accessible to the user. In some embodiments, the third party is another user such that a first user's recipe can be shared with a second user and the first user's recipe can control the operating characteristics of the second user's system.

It will also be appreciated that, while various items are illustrated as being stored in memory 172 or on storage while being used, these items or portions of them may be transferred between memory 172 and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs and/or data structures, such as by execution of software instructions of the one or more software programs and/or by storage of such software instructions and/or data structures.

The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

In some embodiments, the memory 172 stores instructions, information, or other data that is executed by the processor 170 to activate the blower 102, the heating element 124, the pump 162, and the sensor 136 according to a roasting recipe selected by a user input on the personal computing device 178, which may be a mobile device in wireless communication with the communications subsystem 176 of the controller 108. More specifically, the user may select a recipe according to a type or supplier of a certain coffee cherry bean and the personal computing device 178 sends instructions, information, signals, or other data to the communications subsystem 176 of the controller 108. The communications subsystem 178 interfaces with the processor 170, which interfaces with the memory 172 to execute the instructions as a series of distinct or simultaneous actions. For example, execution of the instructions may cause the processor 170 to activate the power interface manager 180, which enables a selected amount of power to be transmitted from the power source 182 to the blower 102, the heating element 124, and the pump 162 over a selected period of time or instances according to the recipe selected by the user.

In further embodiments, the sensor 136 sends instructions, information, signals, or other data to the processor 170, which determines, based on the information received from the sensor 136, whether to adjust the operational characteristics of the blower 102, the heating element 124, and/or the pump 162. For example, the sensor 136 may be a speaker or microphone that collects data corresponding to the sounds occurring proximate the container 122 of the roasting assembly 104 (FIG. 2A). In an embodiment, the sensor 136 is only a microphone. The sounds incident on, and detected by, the microphone may be operational sounds from the blower 102, the heating element 124, and waste collection assembly 106 (FIG. 1A) as well as sounds indicative of certain characteristics of the food product 142 in the container 122 (FIG. 2A). The processor 170 may execute instructions stored in memory 172 to analyze the spectrum of sounds detected by the microphone 136 and filter out known frequencies and volumes of sounds corresponding to operation of the system 100 while simultaneously looking for a specific spike in a given frequency that corresponds to cracking of the food product 142, such as the first crack when roasting coffee cherry seeds. The processor 170 may also execute instructions in memory 172 to determine first crack duration and the time to the first crack (i.e, pre-crack duration) and compare this information to the expected results based on the recipe and adjust operational characteristics of the system 100 in response accordingly.

For example, if the pre-crack duration is too long (i.e., first crack occurs later than expected based on recipe), the processor 170 may execute instructions in memory 172 and interface with the power interface manager 180 to supply more power from power source 182 to the heating element 124 to increase the roast temperature and/or to the blower 102 to increase or decrease the air flow speed. The same process can be applied to increase power to the blower 102 and decrease power to the heating element 124 if the pre-crack duration is too short (i.e., first crack occurs sooner than expected based on recipe), or if the first crack duration is too long or short.

In another non-limiting example, the sensor 136 is, or includes, one or more thermocouples, such as a group of thermocouples in the roasting assembly 104 or container 122. The processor 170 may execute instructions stored in memory 172 to continuously communicate with, and monitor, the one or more thermocouples to measure the food product and determine an accurate temperature of the food product. Based on the determined temperature, the processor 170 executes further instructions stored in memory 172 to control the amount of power to the heating element 124 or the blower 102, or both, to achieve a certain shape of curve for the food temperature, or more specifically, a certain shape of curve for change in food temperate over time in order to maintain a certain rate of rise curve for food product temperature. Where the food product is green coffee cherry seeds, the rate of rise curve may be for bean temperature that is part of a recipe for roasting the green coffee cherry seeds.

In some embodiments, the one or more sensors 136 may include imaging devices and/or a gas sensor with the processor 170 executing instructions stored in memory 172 in much the same way to modify operational characteristics of the system 100. For example, if the imaging device determines that the coffee cherry seeds are turning brown too quickly, the coffee cherry seeds may be roasting too quickly and the processor 170 executes instructions to memory 172 to decrease power to the heating element 102 and increase power to the blower 102. Of course, in any of the above examples, the processor 170 may also execute instructions in memory 172 to only adjust one operating characteristic (i.e., temperature of heating element 124 or air speed output by the blower 102) while all other characteristics remain constant.

In an embodiment, the one or more sensors 136 are, or include, one or more gas sensors and/or moisture sensors. The processor 170 executes instructions stored in memory 172 to communicate with the gas and/or moisture sensors to detect a change in volatile organic compounds in the food product over time and/or change in moisture levels in the food product over time and compares the detected change to a recipe stored in memory 172 to calculate whether the time to first crack is faster or slower than expected. If the time to first crack is different than expected, the processor 170 executes further instructions in memory 172 to adjust the power to heating element 124 and/or blower 102 accordingly. In some embodiments, the moisture sensors also measure water content in the food product and the processor 170 executes instructions in memory 172 to adjust the power to the heating element 124 to a pre-heat temperature or otherwise initiate a drying process prior to, or as part of, the roasting process.

In an embodiment, the system 100 is agnostic to conditions in an external environment around the system 100, meaning that the same quality and consistency of the roasted food product can be achieved regardless of the temperature, humidity, and other characteristics of the external environment around the system 100. For example, the system 100 may include a Global Positioning System ("GPS") receiver or transceiver that provides a location for the system 100 with the process 170 executing instructions stored in memory 172 to communicate with a remote device to obtain location-based external environment data, such as temperature from a public weather agency. Further, the processor 170 may execute instructions stored in memory 172 to obtain external environment data from a personal computing device 178, which may be a user's mobile device, via the communications subsystem 176. In yet a further non-limiting example, the sensors 136 may include temperature, humidity, and other like sensors exposed to an external environment around the system 100 to obtain data regarding the characteristics of the external environment around the system 100. In some embodiments, the system 100 gathers data from only one or more than one of the above sources. Irrespective of the source of the data, the processor 170 executes instructions in memory 172 to adjust the heating element 124 and/or blower 102 (or other operating characteristic of the system 100) based on the external environment around the system 100 to produce results (i.e., a roasted food product) with the same quality and consistency irrespective of the conditions of the external environment. In this way, the processor 170 executes instructions stored in memory 172 to adjust operational characteristics of the system 100 to ensure uniformity of roast in a feedback control loop with the one or more sensors 136. Advantageously, this functionality is provided in the form factor of a countertop appliance to simplify the roasting process and enable successful roasting at consumer scale. This feedback control loop also accounts for variations in batch size because the recipe is adjusted based on the detected characteristics of the roast to ensure uniformity with the recipe.

In an embodiment, the memory 172 stores further instructions that are executed by the processor 170 associated with a cooling operation in the container 122. For example, the instructions may include instructions to terminate power to the heating element 124 and activating the blower 102 for a selected period of time, such as 10 seconds or less, 30 seconds or less, 1 minute or less, or 5 minutes or less, inclusive of all intervening values in some non-limiting examples. The cooling operation may occur once, or more than once, depending on the detected characteristics of the coffee cherry seeds in the container 122 according to the techniques of the present disclosure.

In some embodiments, the controller 108 and the system 100 generally are in communication with other devices 182, which may be a network or a database stored on remote servers or personal computing devices for providing new recipes accessible via the personal computing device 178. Further, the controller 108 and the system 100 may be in communication with other such systems 100 and/or networked appliances, such as in a "smart home" system using any of the communication protocols described herein. Such networked appliances may include, but are not limited to, smart home speakers such as Amazon Alexa®, Google Home®, and Apple Siri® products, among others.

Thus, one or more embodiments of a countertop roasting device may be summarized as including: a blower having an outlet; a roasting assembly coupled to the blower, including a heating element disposed at the outlet of the blower, a grate on the heating element, and a container having an inlet and an outlet, the inlet in communication with the outlet of the blower through the grate; and a waste collection assembly in communication with the roasting assembly, including a chamber having an inlet in communication with the outlet of the container and an outlet, and a bin in communication with the outlet of the chamber.

The blower is operable to output air that flows through the roasting assembly and the grate includes nozzles operable to structure the air and generate movement of a food product in the container of the roasting assembly.

The waste collection assembly further includes a spray bar positioned proximate the inlet of the chamber, and a water tank in fluid communication with the bin and the spray bar, the water tank structured to provide water to the spray bar with the spray bar operable to output the water to a waste product output from the roasting assembly, and the bin of the waste collection assembly operable to collect the waste product and water mixture with the water in the bin returned to the water tank in a fluid loop.

The countertop roasting device further includes: a controller in communication with the blower, the roasting assembly, and the microphone, the controller including a memory configured to store instructions and at least one processor configured to execute the instructions to activate the blower to output air to the container of the roasting assembly, activate the heating element to heat the air from the blower and generate a heated air stream that passes through the roasting assembly and roasts a food product received in the container of the roasting assembly, and terminate operation of the heating element while maintaining operation of the blower to cool the roasted food product.

The chamber of the waste collection assembly includes a vent, the countertop roasting device further including a filter at least partially covering the vent to suppress smoke output through the vent.

The countertop roasting device further includes a microphone coupled to the roasting assembly and a controller in communication with the blower, the roasting assembly, and the microphone, the controller including a memory configured to store instructions and at least one processor configured to execute the instructions to: activate the blower to output air to the container of the roasting assembly; activate the heating element to heat the air from the blower and generate a heated air stream that passes through the roasting assembly and roasts a food product received in the container of the roasting assembly; determine, with the microphone, whether a characteristic of the food product has changed; and adjust an operational characteristic of at least one of the blower and the heating element in response to the determination of whether the characteristic of the food product has changed.

The countertop roasting device includes at least one thermocouple in communication with the controller, the memory configured to store further instructions and the at least one processor configured to execute the further instructions to: determine, with the at least one thermocouple, a temperature of an external environment around the countertop roasting device; and adjust the operational characteristic of at least one of the blower and the heating element in response to the determination of the temperature of the external environment.

One or more embodiments of a roasting device may be summarized as including: a fan operable to output an air stream; a heating element in communication with the fan operable to heat the air stream and generate a heated air stream; a chamber having an inlet and an outlet with a flow path through the chamber from the inlet to the outlet, the inlet of the chamber in communication with the heating element and the chamber structured to receive a food item and roast the food item via the heated air stream in the chamber; and a collection bin in fluid communication with the outlet of the chamber and structured to receive a waste product of the food item.

The roasting device further includes a microphone coupled to the chamber, and a controller in communication with the fan, the heating element, and the microphone, the controller including a memory configured to store instructions and at least one processor configured to execute the instructions to: determine, with the microphone, whether a characteristic of the food item has changed; and adjust an operational characteristic of at least one of the fan and the heating element in response to the determination of whether the characteristic of the food item has changed.

The chamber is structured to move between a first position to secure the food item in the chamber and a second position to release the roasted food item from the chamber.

The collection bin includes a separation chamber operable to separate particulate matter of the waste product from air, and a waste receptacle coupled to the separation chamber and operable to collect the particulate matter.

The separation chamber includes a vent tube operable to vent air from the separation chamber to an external environment.

The separation chamber further includes a spray bar operable to output water to the waste product and the particulate matter with the water and particulate matter mixture collected in the waste receptacle.

The collection bin further includes a water tank in fluid communication with the spray bar and the waste receptacle, the water tank operable to provide water to the spray bar and receive the collected water from the waste receptacle in a fluid loop.

One or more embodiments of a roasting device may be summarized as including: a blower; a roasting assembly coupled to the blower, including a heating element; a microphone coupled to the roasting assembly; a waste collection assembly in communication with the roasting assembly; and a controller in communication with the blower, the roasting assembly, and the microphone, the controller including a memory configured to store instructions and at least one processor configured to execute the instructions to activate the blower to output air to the roasting assembly, activate the heating element to heat the air from the blower and generate a heated air stream that passes through the roasting assembly and roasts a food product received in the roasting assembly, determine, with the microphone, whether a shell of the food product has cracked, and adjust an operational characteristic of at least one of the blower and the heating element in response to the determination of whether the shell of the food product has cracked.

The roasting element further includes a grate on the heating element, and a container having an inlet and an outlet, the inlet in communication with the outlet of the blower through the grate.

The grate includes a plurality of openings operable to structure airflow from the blower and produce movement of the food product in the roasting assembly.

The waste collection assembly further includes a chamber having an inlet in communication with the outlet of the container and an outlet, and a bin in communication with the outlet of the chamber.

The waste collection assembly further includes a spray bar positioned proximate the inlet of the chamber, and a water tank in fluid communication with the bin and the spray bar, the water tank structured to provide water to the spray bar with the spray bar operable to output the water to a waste product output from the roasting assembly, the bin of the waste collection assembly operable to collect the waste product and water mixture with the water in the bin returned to the water tank in a fluid loop.

The memory is configured to store further instructions and the at least on processor is configured to execute the instructions to: receive a recipe of a first user from a remote computing device; modify the recipe based on characteristics of an external environment around the roasting assembly of a second user; and roast the food product of the second user according to the modified recipe.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form.

The above description of illustrated embodiments, including what is described in the Abstract, is not intended to be exhaustive or to limit the implementations to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied outside of the detection system and device context, and are not limited to the example detection systems, methods, and devices generally described above.

For instance, the foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, as a cloud computing system, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a nonexhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory media.

Many of the methods described herein can be performed with variations. For example, many of the methods may include additional acts, omit some acts, and/or perform acts in a different order than as illustrated or described.

In the above description, certain specific details are set forth in order to provide a thorough understanding of various embodiments of the disclosure. However, one skilled in the art will understand that the disclosure may be practiced without these specific details. In other instances, well-known structures associated with roasting systems, devices, and methods have not been described in detail to avoid unnecessarily obscuring the descriptions of the embodiments of the present disclosure.

Certain words and phrases used in the specification are set forth as follows. As used throughout this document, including the claims, the singular form "a", "an", and "the" include plural references unless indicated otherwise. Any of the features and elements described herein may be also be singular, e.g., a support may refer to one support. The terms "include" and "comprise," as well as derivatives thereof, mean inclusion without limitation. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Other definitions of certain words and phrases are provided throughout this disclosure.

The use of ordinals such as first, second, third, etc., does not necessarily imply a ranked sense of order, but rather may only distinguish between multiple instances of an act or a similar structure or material.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other derivatives thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Generally, unless otherwise indicated, the materials for making the invention and/or its components may be selected from appropriate materials such as composite materials, ceramics, plastics, metal, polymers, thermoplastics, elastomers, plastic compounds, and the like and may include one or more additives and coatings.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

The terms "top," "bottom," "upper," "lower," "left," "right," and other like derivatives are used only for discussion purposes based on the orientation of the components in the Figures of the present disclosure. These terms are not limiting with respect to the possible orientations explicitly disclosed, implicitly disclosed, or inherently disclosed in the present disclosure and unless the context clearly dictates otherwise, any of the aspects of the embodiments of the disclosure can be arranged in any orientation.

As used herein, the term "substantially" is construed to include an ordinary error range or manufacturing tolerance due to slight differences and variations in manufacturing. Unless the context clearly dictates otherwise, relative terms such as "approximately," "substantially," and other derivatives, when used to describe a value, amount, quantity, or dimension, generally refer to a value, amount, quantity, or dimension that is within plus or minus 5% of the stated value, amount, quantity, or dimension. It is to be further understood that any specific dimensions of components or features provided herein are for illustrative purposes only with reference to the various embodiments described herein, and as such, it is expressly contemplated in the present disclosure to include dimensions that are more or less than the dimensions stated, unless the context clearly dictates otherwise.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:

a countertop roasting device, including:

a base extending along a first direction;

a frame extending along a second direction transverse to the first direction, the frame coupled to the base;

a blower coupled to the base, the blower having an outlet;

an elbow having a first end and a second end, the first end coupled to and in fluid communication with the outlet of the blower;

a roasting assembly suspended above the base, the roasting assembly including:

an inlet coupled to and in fluid communication with the second end of the elbow;

a central opening for dispensing roasted food product to space between the base and the roasting assembly, the central opening adjacent the inlet of the roasting assembly;

a support cylinder coupled to the frame;

a heating element over the inlet of the roasting assembly;

a tapered grate on the heating element, the grate and the heating element coupled to the support cylinder;

a container having an inlet and an outlet, the inlet in communication with the outlet of the blower through the grate; and a filter plate on the container, the filter plate having:

a central hole for receiving food product for roasting, the central hole in communication with the container;

a plurality of holes smaller than and spaced around the central hole, the plurality of holes in communication with the container; and a removable cap on the central hole;

a channel coupled to the filter plate, the channel extending along the first direction and in fluid communication with the plurality of holes;

a waste collection assembly coupled to the channel and in communication with the roasting assembly, including:

a chamber having an inlet in communication with the outlet of the container and an outlet; and a bin in communication with the outlet of the chamber.

2. The device of claim 1, wherein the blower is operable to output air that flows through the roasting assembly, the grate including nozzles operable to structure the air and generate movement of a food product in the container of the roasting assembly.

3. The device of claim 1, wherein the waste collection assembly further includes:

a spray bar positioned proximate the inlet of the chamber; and a water tank in fluid communication with the bin and the spray bar, the water tank structured to provide water to the spray bar with the spray bar operable to output the water to a waste product output from the roasting assembly, the bin of the waste collection assembly operable to collect the waste product and water mixture with the water in the bin returned to the water tank in a fluid loop.

4. The device of claim 1, wherein the countertop roasting device further includes:

a microphone coupled to the support cylinder;

a controller in communication with the blower, the roasting assembly, and the microphone, the controller including a memory configured to store instructions and at least one processor configured to execute the instructions to:

activate the blower to output air to the container of the roasting assembly;

activate the heating element to heat the air from the blower and generate a heated air stream that passes through the roasting assembly and roasts a food product received in the container of the roasting assembly; and terminate operation of the heating element while maintaining operation of the blower to cool the roasted food product.

5. The device of claim 1, wherein the chamber of the waste collection assembly includes a vent, the countertop roasting device further including a filter at least partially covering the vent to suppress smoke output through the vent.

6. The device of claim 1, wherein the countertop roasting device further includes:

a microphone coupled to the roasting assembly; and a controller in communication with the blower, the roasting assembly, and the microphone, the controller including a memory configured to store instructions and at least one processor configured to execute the instructions to:

activate the blower to output air to the container of the roasting assembly;

activate the heating element to heat the air from the blower and generate a heated air stream that passes through the roasting assembly and roasts a food product received in the container of the roasting assembly;

determine, with the microphone, whether a characteristic of the food product has changed; and adjust an operational characteristic of at least one of the blower and the heating element in response to the determination of whether the characteristic of the food product has changed.

7. The device of claim 6, wherein the memory is configured to store further instructions and the at least one processor configured to execute the further instructions to:

determine a temperature of an external environment around the countertop roasting device; and adjust the operational characteristic of at least one of the blower and the heating element in response to the determination of the temperature of the external environment.

8. A roasting device, comprising:

a fan operable to output an air stream;

a heating element in communication with the fan operable to heat the air stream and generate a heated air stream;

a elbow in communication with the fan operable to provide the air stream to the heating element;

a chamber having an inlet and an outlet with a flow path through the chamber from the inlet to the outlet, the inlet of the chamber in communication with the heating element and the chamber structured to receive a food item and roast the food item via the heated air stream in the chamber;

a guide plate in communication with the chamber, the guide plate having sloped sides and an opening for dispensing roasted food item, the opening adjacent to the elbow;

a cone-shaped separation chamber operable to separate particulate matter of a waste product of the food item from air, the separation chamber having a first opening opposite a second opening, the first opening is a vent and the second opening is an outlet; and a collection bin in fluid communication with the outlet of the separation chamber and structured to receive a waste product of the food item, the collection bin is beneath the outlet of the separation chamber.

9. The roasting device of claim 8, further comprising:

a microphone coupled to the chamber; and a controller in communication with the fan, the heating element, and the microphone, the controller including a memory configured to store instructions and at least one processor configured to execute the instructions to:

determine, with the microphone, whether a characteristic of the food item has changed; and adjust an operational characteristic of at least one of the fan and the heating element in response to the determination of whether the characteristic of the food item has changed.

10. The roasting device of claim 8, wherein the chamber is structured to move between a first position to secure the food item in the chamber and a second position to release the roasted food item from the chamber.

11. The roasting device of claim 8, wherein the separation chamber includes a vent tube operable to vent air from the separation chamber to an external environment.

12. The roasting device of claim 8, wherein the separation chamber further includes a spray bar operable to output water to the waste product and the particulate matter, the water and particulate matter mixture collected in the collection bin.

13. The roasting device of claim 12, further including a water tank in fluid communication with the spray bar and the collection bin, the water tank operable to provide water to the spray bar and receive the collected water from the collection bin in a fluid loop.

14. A roasting device, comprising:

a blower;

a roasting assembly coupled to the blower, including a heating element, the roasting assembly spaced from the blower along a first direction;

a curved pipe coupled to the blower and the roasting assembly;

a microphone coupled to the roasting assembly;

a waste collection assembly in communication with the roasting assembly, the waste collection assembly spaced from the blower along a second direction that is transverse to the first direction;

a controller in communication with the blower, the roasting assembly, and the microphone, the controller including a memory configured to store instructions and at least one processor configured to execute the instructions to:

activate the blower to output air to the roasting assembly;

activate the heating element to heat the air from the blower and generate a heated air stream that passes through the roasting assembly and roasts a food product received in the roasting assembly;

determine, with the microphone, whether a shell of the food product has cracked; and adjust an operational characteristic of at least one of the blower and the heating element in response to the determination of whether the shell of the food product has cracked; and a first opening for receiving food product for roasting;

a second opening opposite the first opening for dispensing roasted food product, the second opening being closer to the curved pipe than the first opening;

a third opening for venting air, the third opening in the waste collection assembly and spaced from the first opening along a first direction; and a fourth opening for dispensing waste food product, the fourth opening opposite the third opening.

15. The roasting device of claim 14, wherein the roasting assembly further includes:

a grate on the heating element; and a container having an inlet and an outlet, the inlet in communication with the outlet of the blower through the grate.

16. The roasting device of claim 15, wherein the grate includes a plurality of openings operable to structure airflow from the blower and produce movement of the food product in the roasting assembly.

17. The roasting device of claim 15, wherein the waste collection assembly further includes:

a chamber having an inlet in communication with the outlet of the container and an outlet; and a bin in communication with the outlet of the chamber.

18. The roasting device of claim 17, wherein the waste collection assembly further includes:

a spray bar positioned proximate the inlet of the chamber; and a water tank in fluid communication with the bin and the spray bar, the water tank structured to provide water to the spray bar with the spray bar operable to output the water to a waste product output from the roasting assembly, the bin of the waste collection assembly operable to collect the waste product and water mixture with the water in the bin returned to the water tank in a fluid loop.

19. The roasting device of claim 14, wherein the memory is configured to store further instructions and the at least on processor is configured to execute the instructions to:

receive a recipe of a first user from a remote computing device;

modify the recipe based on characteristics of an external environment around the roasting assembly of a second user; and roast the food product of the second user according to the modified recipe.

* * * * *